(12) United States Patent
Muench et al.

(10) Patent No.: US 7,437,208 B2
(45) Date of Patent: Oct. 14, 2008

(54) SYSTEM FOR COMPUTER-AIDED MEASUREMENT OF QUALITY AND/OR PROCESS DATA IN A PAPER MACHINE

(75) Inventors: Rudolf Muench, Koenigsbronn (DE); Niels Hardt, Heidenheim (DE); Pekka M. Typpo, Cupertino, CA (US); Florian Wegmann, Herbrechtingen (DE); Herbert Holik, Ravensburg (DE)

(73) Assignee: Voith Patent GmbH, Heidenheim (DE)

( * ) Notice: Subject to any disclaimer, the term of this patent is extended or adjusted under 35 U.S.C. 154(b) by 679 days.

(21) Appl. No.: 10/942,598

(22) Filed: Sep. 16, 2004

(65) Prior Publication Data

US 2005/0145357 A1 Jul. 7, 2005

(30) Foreign Application Priority Data

Sep. 16, 2003 (DE) ............................. 103 42 769

(51) Int. Cl.
*G06F 7/64* (2006.01)
*D21F 7/06* (2006.01)

(52) U.S. Cl. ..................................... 700/128; 162/263
(58) Field of Classification Search ............. 700/28–31, 700/47–50, 108–110, 127–129; 702/81–84; 162/198, 199, 201, 202, 263
See application file for complete search history.

(56) References Cited

U.S. PATENT DOCUMENTS

| | | | |
|---|---|---|---|
| 6,445,963 B1 | 9/2002 | Blevins et al. | 700/44 |
| 6,556,939 B1 * | 4/2003 | Wegerich | 702/127 |
| 6,597,959 B1 | 7/2003 | Backa et al. | 700/30 |
| 6,684,115 B1 * | 1/2004 | Cheng | 700/45 |
| 6,733,629 B1 * | 5/2004 | Matula | 162/190 |
| 6,826,521 B1 * | 11/2004 | Hess et al. | 703/12 |
| 6,853,920 B2 * | 2/2005 | Hsiung et al. | 702/1 |
| 7,082,348 B1 * | 7/2006 | Dahlquist et al. | 700/128 |

(Continued)

FOREIGN PATENT DOCUMENTS

DE 37 41 128 6/1988

(Continued)

OTHER PUBLICATIONS

Successful Applications of Fuzzy Logic and Fuzzy Control; Bernd-Markus Pfeiffer, et al.; Oct. 2002.

*Primary Examiner*—M. N. Von Buhr
(74) *Attorney, Agent, or Firm*—Taylor & Aust, P.C.

(57) ABSTRACT

A system for the computer-aided measurement of quality and/or process data during the production and/or conversion of a material web, in particular paper or board web, by way of correlation with raw measured data. The raw measured data is present in the form of other quality and process data during the production or conversion process. Measurements of quality parameters in the laboratory may also be incorporated in the raw measured data. The raw measured data is combined to form data sets which in each case are determined simultaneously. Specific laboratory or quality measurements are selected as target data which, by way of at least one soft-sensor algorithm running in a computer-based operation and linking unit, can be calculated from the other data serving as input data, and each data set containing measured data, which relates approximately to the same monitored volume of web and raw material, in particular paper and paper raw material.

55 Claims, 5 Drawing Sheets

U.S. PATENT DOCUMENTS

| | | |
|---|---|---|
| 7,107,108 B2 * | 9/2006 | Woergoetter et al. .......... 700/39 |
| 7,113,838 B2 * | 9/2006 | Funk et al. ................. 700/108 |
| 7,123,980 B2 * | 10/2006 | Funk et al. ................. 700/121 |
| 7,146,231 B2 * | 12/2006 | Schleiss et al. ............... 700/83 |
| 7,213,174 B2 * | 5/2007 | Dahlquist et al. ............. 714/37 |
| 2002/0198679 A1 | 12/2002 | Victor et al. ................ 702/176 |
| 2004/0199368 A1 * | 10/2004 | Bechhoefer .................... 703/7 |
| 2004/0256069 A1 * | 12/2004 | Saucedo et al. ............. 162/158 |
| 2005/0165731 A1 * | 7/2005 | Funk ............................. 707/1 |
| 2005/0268197 A1 * | 12/2005 | Wold ......................... 714/746 |

FOREIGN PATENT DOCUMENTS

| | | |
|---|---|---|
| DE | 196 53 477 | 6/1998 |
| DE | 199 13 926 | 9/2000 |
| WO | 02/16694 | 2/2002 |

* cited by examiner

# SYSTEM FOR COMPUTER-AIDED MEASUREMENT OF QUALITY AND/OR PROCESS DATA IN A PAPER MACHINE

BACKGROUND OF THE INVENTION

1. Field of the Invention

The present invention relates to a system for the computer-aided measurement of quality and/or process data during the production and/or conversion of fiber material webs, in particular paper or board webs.

2. Description of the Related Art

Production plants, in particular plants for paper production, are large, technically complicated plants. In addition to the actual papermaking machine with wet end, drying section, calender, reel-up and associated peripheral units, includes units connected upstream, such as flotation, screening, deculators, and also systems connected downstream, such as rewinder units, roll slitting machines, roll packaging and roll transport. There is a great deal of interest in optimizing such production plants further, in particular with regard to the quality that can be achieved.

What is needed in the art is an efficient method of monitoring quality and/or process data.

SUMMARY OF THE INVENTION

The present invention is based on the object of appropriately improving the system for the computer-aided measurement of quality and/or process data.

According to the present invention, this object is achieved by a system for the computer-aided measurement of quality and/or process data during the production and/or conversion of material webs, in particular paper or board webs, by way of correlation with raw measured data. The raw measured data being present in the form of much other quality and process data obtained during the production or conversion process. It is possible for measurements of quality parameters in the laboratory to also be incorporated in the raw measured data. The raw measured data can be combined to form data sets which in each case are determined simultaneously. Specific laboratory or quality measurements are selected as target data, which by way of at least one soft-sensor algorithm running in a computer-based operation and linking unit, can be calculated from the other data serving as input data. Each data set contains measured data, which relates approximately to the same monitored volume of web and raw material, in particular paper and paper raw material.

On the basis of this structure, a system for the computer-aided measurement of quality and/or process data, having at least one software-based sensor, is provided. The system, which, inter alia, allows current information to be drawn up from plant measurements, quality measurements and analyses, virtually in real time, in order, for example, to improve the running of the plant.

The raw measurements are expediently given a timestamp.

A respective soft-sensor algorithm can advantageously be determined by way of mathematical methods, for example by way of Principal Component Analysis (PCA), Partial Least Squares Recursive (PLSR), Self Organizing Maps (SOM), fuzzy, neural networks and/or the like.

In one embodiment of the system according to the present invention, the soft-sensor algorithm, in the computer-based operation and linking unit, runs automatically as soon as there is new input data.

However, another embodiment of the present invention includes, for example, a soft-sensor algorithm in the computer-based operation and linking unit that runs automatically with a fixed or predefinable cycle time.

In specific cases, it is also advantageous if the soft-sensor algorithm, in the computer-based operation and linking unit, runs in response to a manual request.

In a further embodiment of the system according to the present invention, the soft-sensor algorithm, in the computer-based operation and linking unit, runs when at least one condition for execution is satisfied. After the soft-sensor algorithm has run, the result is output as the desired measurement, in particular by way of at least one display and/or printer unit.

The timestamps can be provided with an offset in order to compensate for transport dead times, which the monitored volume runs through during the production or conversion process.

During the synchronization of data, which is registered on the continuous process, and on offline processes connected downstream, the use of transport dead times is not the suitable method. Here, instead, use is preferably made of web length information and the spool number is applied, for example, to the edge of the web, in order to ensure that the measurements relate to the same monitored volume.

It is also advantageous; in particular, if a pre-filtering of the items of data is coordinated with one another. In particular, also taking account of the accuracy with which the simultaneity of the data sets is known. It is possible for the data to be determined in particular from a sliding average filter and a predefinable window size.

If, following the compensation of the dead times, simultaneity, with an accuracy of, for example, 1 minute is guaranteed, the data is determined, from a sliding average filter and a window size in the minutes range (for example 5 min.). In order to suppress measurement noise, in the case of some data, it is appropriate to deviate from this rule and to filter the data more intensely. If a large amount of data is registered, for example, only as a spool average, it is not expedient to use, at the same time, other data which is very weakly filtered. It should likewise be filtered to a similar order of magnitude.

The input data preferably also includes data from other sections of the production or conversion process as the target data. For example, the target data can originate from the process section including the reel-up of the papermaking machine (for example, quality data at the reel-up). The input data can be, inter alia, for example, process data from other process sections, which are upstream in the papermaking machine or work with the latter, such as a color kitchen, water treatment, stock preparation, the wet end and so on.

The system advantageously includes at least one soft-sensor that can preferably be determined by a design tool. By way of the design tool, recorded input data and target data can be extracted from a database having historic data. From the historic data, at least two groups of data sets can be selected. The first group contains a training data set used to calculate the soft-sensor algorithm, and the second group contains a test data set having other data used to test the calculated soft-sensor algorithm. The training data set can, if appropriate, be subdivided still further into groups of data sets, which are used for different purposes during the training process. By way of the design tool, it is also advantageously possible to test which input data is not correlated with the target data. It is possible for the relevant input data to be eliminated from the training data set. It is also advantageous if, by way of the design tool, it is possible to test which input data in the training data set is redundant, with use continuing to be made only of input data which improves the correlation with the target data.

In addition, by way of the design tool, it is advantageously possible to test which input data, in the training data set, has a nonlinear relationship with the target data. The nonlinear data may be added to the training data set. Advantageously, by way of the design tool, the calculation formula of the soft-sensor algorithm can be determined with the training data set. It is also advantageous in particular if, by way of the design tool, the calculation formula of the soft-sensor algorithm is tested by using the test data set. Preferably, by way of the design tool, the calculation formula of the soft-sensor algorithm can then be implemented in an associated computer, by way of which, in the event of a respective change in the input data, the target data can then be output and which therefore behaves like a sensor.

In another embodiment of the system according to the present invention, the soft-sensor algorithm is adapted to automatically slow changes in the production or conversion process by way of repeated, automatic starting of the design tool or procedure. It is possible for data from a specific time window in the past to continue to be used.

The use of the system according to the present invention includes the use of at least one soft-sensor during the production and/or conversion of material webs, in particular paper or board webs. At least one soft-sensor, belonging to the system, is preferably used for checking at least one real sensor. For example, at least one soft-sensor belonging to the system can be used for the grammage and/or the thickness of the material web, in order to check an associated scanner. In this case, two soft-sensors, belonging to the system, are used in order to decide, preferably using a two-of-three rule, whether there is a possible fault in a soft-sensor or in the scanner. For example, a first soft-sensor, belonging to the system, could use, for example, flow, consistency and/or the like relevant data from the region of a flow box, and a second soft-sensor, belonging to the system, could use, for example, flow, consistency and/or the like relevant data from a thick stock feed.

It has been shown that, apart from the flow and the consistency, other process variables are also necessary in order to predict the grammage sufficiently accurately. For instance, if it is known that the consistency meter reacts sensitively to ash, then in order to predict the grammage of the material web, in an improved way, apart from a flow and consistency measurement, an ash measurement can additionally be carried out and/or the ash metering quantity can be measured.

In order to predict the web thickness, at least one of the present process variables can advantageously also be used as well: stock composition, press settings, calender settings.

In connection with the checking of a plurality of sensors, a corresponding alarm system can be activated if appropriate.

It is also advantageous if at least one soft-sensor, belonging to the system, is used for the purpose of substituting for one or more real sensors, at least for some time, in the event of a fault. The respective substitution can, in particular, be carried out automatically, a real sensor preferably being identified as faulty by using a two-of-three rule ("hot backup").

Hitherto, the process could not continue to function in a regulated manner in the event of a faulty real sensor. Depending on the quality of the soft-sensor and the required paper quality, the real sensor can, according to the present invention, be substituted by a soft-sensor in the event of a fault. Consequently, an immediate shutdown of the machine is no longer required.

Conversely, a soft-sensor, belonging to the system, can also be checked and, if necessary, substituted by a real sensor and another sensor, in particular a soft-sensor. Thus, for example with two soft-sensors, the grammage can be predicted. If one of the soft-sensors suddenly indicates considerably different values, this is an indication that one of the basic sensors is defective. The fault profile can be restricted further with the aid of further process variables. For example, the function of a flow meter can be checked with the measured results from other flow meters (water balance). If the flow meter is not the cause, then the consistency transmitter is considered for the fault behavior. However, the consistency can also be determined from other process variables, such as mass balance. In the final effect, it is then possible, with the aid of further process variables, including the real grammage sensor and a soft grammage sensor, to substitute for the consistency sensor and to continue to keep the control systems dependent on this running.

The fact that a sensor can be substituted for by others is primarily expressed by way of colinearities in the many process variables. Particularly advantageous is also the use of at least one soft-sensor, belonging to the system, for the grade-independent calibration of one or more real sensors.

Real or true sensors can frequently be calibrated only at a specific operating point or in a specific operating range of the machine. For example, with one calibration, the paper moisture can be measured accurately only at a specific grammage. However, if the grammage then changes, another calibration is necessary. In order to make the calibration easier, real sensors frequently have a number of internal measuring channels. However, this is often inadequate. The calibration continues to be not quite independent of the operating point of the machine.

Advantageously, therefore, according to a further embodiment of the system according to the present invention, at least one internal measuring channel of at least one real sensor is extended, by incorporating further process and quality data in order to calculate the actual measured variable. For instance, in conjunction with a moisture sensor, the grammage, the type of fiber and/or the like can also be incorporated.

As a further example, mention should be made of the measurement of the dryness, which, at a specific point in the dewatering process, will function better with a soft-sensor, which, in addition to the raw measuring channels (for example optical, electromagnetic, radioactive absorption), also uses process parameters such as the stock consistency in the flow box, the type of stock, settings of the dewatering parameters and/or the like as well.

In specific cases, it can also be advantageous if at least one soft-sensor, belonging to the system, is used instead of a respective real sensor, as long as the real sensor is not yet ready for use. This can be done, for example, when starting up production, that is to say before the web is transferred, the grammage can already be set. Before the scanners measure the web, further machine settings can already be made correctly, in order to set thickness, gloss and/or moisture, for example.

Furthermore, the use of at least one soft-sensor, belonging to the system, is advantageous in order, during the production or conversion process, to measure quality data. The measurement of quality data can usually only be measured in the laboratory and/or which can be measured online by way of real sensors only in a more costly and/or less reliable manner. In this case, a respective soft-sensor can be used, for example, to measure the porosity, printability, strength parameters and/or the like.

If a soft-sensor is used during production to measure quality data, which can usually be measured only in the laboratory or which can be measured online with real sensors only in a very expensive or unreliable manner, then during the production or conversion process, the quality data to be expected for the current measured variables is preferably calculated and monitored with the aid of the calculation formula of the software sensor algorithm.

For the case in which a calculated value lies outside the tolerance limit, a warning signal for the machine operating personnel can be generated and/or measures that are predefined by an automatic control system can be taken. The predefinable measures can include, for example, a change in process parameters in order to eliminate the cause of the deviation directly. Alternatively, or additionally, a change in parameters from process steps, which follow the subprocess responsible for the deviation, is also conceivable.

For instance, if a fault in the ash feed leads to poorer printabilities to be expected, then the machine personnel are able to eliminate the fault after some hours, for example after 6 hours, for example by changing process parameters for the direct elimination of the cause of the deviation. For the poor raw paper produced in the meantime, by changing parameters from process steps, which follow the subprocess responsible for the deviation, the calender settings can be changed in such a way that, in spite of faulty raw paper, the printability values to be expected of the finished paper lie within the tolerance.

In the following, mention will be made of some examples of quality data, which are of importance for such a method. For example, according to one use of the system according to the present invention, during the production or conversion process, it is possible, to measure quality data, which is measured in the laboratory, as a standard for each spool. The relevant quality data preferably includes strengths, porosity, surface properties and/or the like. The main advantage here consists in the highly shortened time between the occurrence of the fault and the detection of the fault by the soft-sensor.

According to a further use of the system according to the present invention, during the production or conversion process, quality data is measured, which was not previously measured for each spool. The relevant quality data preferably including printability values such as mottling, missing dots and/or the like on papers printed in accordance with a standardized laboratory or industrial printing process. Apart from the advantage of the gain in time in detecting the fault, it is primarily of particular importance here that the measurements can, to some extent, be substituted by the soft-sensor, apart from the measurements required, in order to check the soft-sensor equation, or that it is possible to dispense with an increase in the number of measurements necessary for quality assurance.

Advantageous, in particular, is also the use of at least one soft-sensor, belonging to the system, according to the present invention in order to regulate quality parameters such as the porosity, printability, moisture parameters and/or the like automatically.

Alternatively, or additionally, at least one soft-sensor, belonging to the system according to the present invention, can also be used for determining process characteristic curves. For example, if a soft-sensor is designed to determine the moisture at the reel-up and the input data includes, in particular, the action of the moisture actuating elements, parameters from the dewatering region, the stock composition, the amount of stock and also the state of the clothing, it is possible to read from the soft-sensor how the change in a process parameter, for example, the press line force, affects the final moisture, depending on the state of the clothing.

It is also advantageous if at least one soft-sensor, belonging to the system according to the present invention, is used within the context of an if-then analysis in order, before a change in process variables, to predict the anticipated effect of these changes on the production or conversion process. In this case, the prediction can be for at least one process and/or quality control system.

If, for example, the press setting is changed, then it is therefore possible to predict how the steam pressure has to be changed in order to compensate for the effect on the final moisture. An automatic control system can then adjust the press setting in the manner desired by the operator and therefore also adapt the setting of the drying section in a coordinated manner such that the final moisture remains unaffected.

According to a further embodiment of the present invention, at least one soft-sensor, belonging to the system, is used together with at least one mathematical optimization method in order to determine optimal machine settings and/or process parameters. Here, again, at least one soft-sensor, belonging to the system according to the present invention can be determined by way of a design tool. Input data and target data recorded by way of the design tool can be extracted from a database having historic data. From the historic data, at least two groups of data sets can be selected, a first group containing a training data set is used to calculate the soft-sensor algorithm and a second group containing a test data set having other data is used to test the calculated soft-sensor algorithm.

Expediently, machine settings and/or process parameters, with respect to specific quality properties, are optimized by way of at least one mathematical optimization method. For example, a minimization under secondary conditions, a minimization of a plurality of variables (for example vector optimization) and/or the like is possible. At least one confirmation trial can be carried out for the purpose of verification. The production or conversion process is preferably changed to the optimized machine settings or process parameters.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

In the following text, some partial aspects belonging to the invention will be explained additionally with reference to the drawing, in which.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Figure 1:
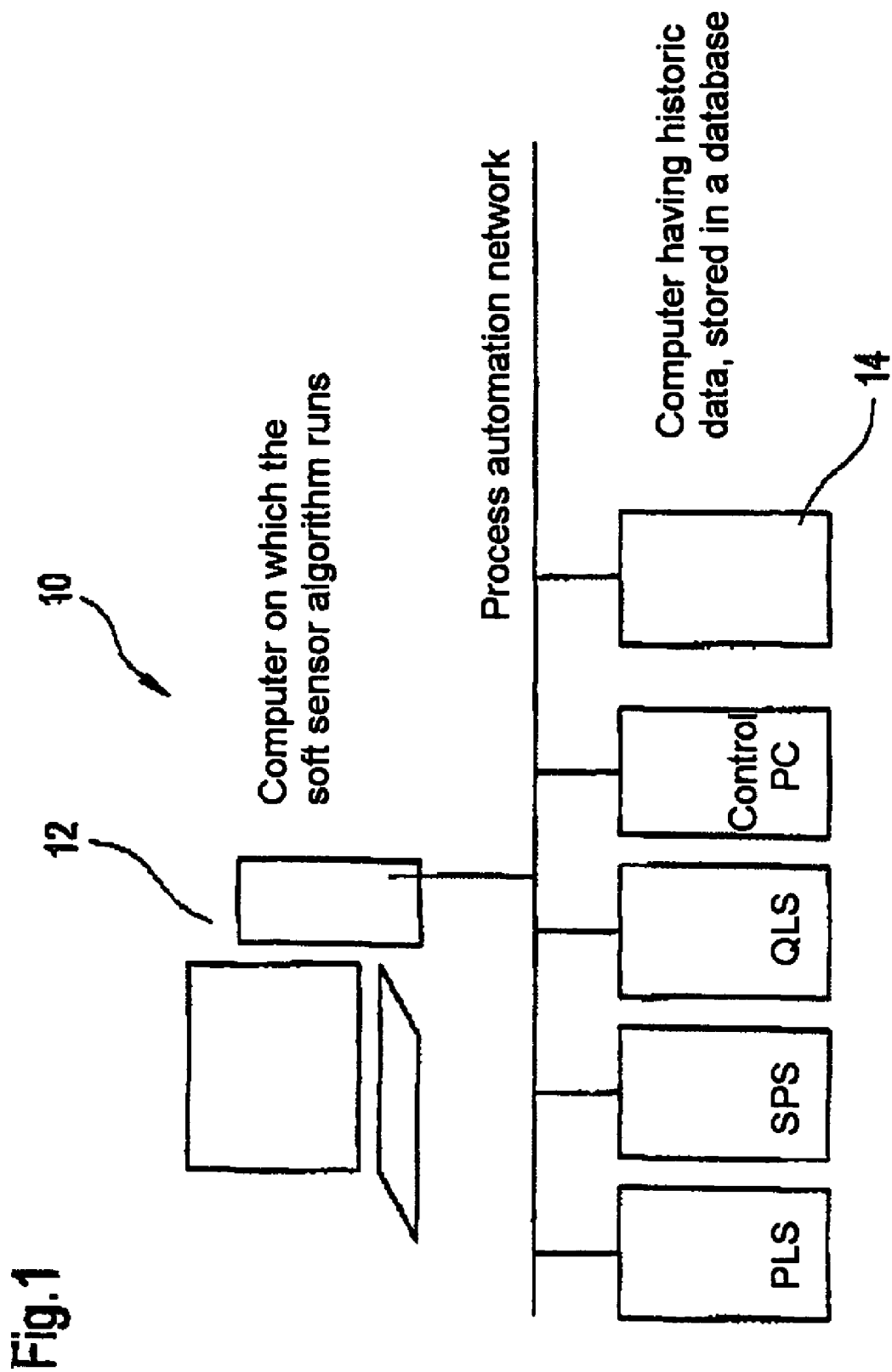
FIG. 1 shows a schematic illustration of an embodiment of a system for the computer-aided measurement of quality and/or process data during the production and/or conversion of material webs, of the present invention.

Referring now to the drawings, and more particularly to FIG. 1 there is shown a schematic illustration of an embodiment of a system 10 for the computer-aided measurement of quality and/or process data during the production and/or conversion of material webs, which can in particular be paper or board webs. System 10 includes a computer or operation and linking unit 12, on which a soft-sensor algorithm runs and which is embedded in an automation system.

The automation system can includes, a Distributed Control System (DCS), a Quality Control System (QCS), a Programmable Logic Controllller (PLC) and/or a further control Personal Controller (PC).

As can be seen in FIG. 1, a separate computer 14 is additionally provided, which contains a database having historic process and quality data. This data can, in principle, also be present on other units but must be accessible during the design of the soft-sensor algorithm.

Figure 2:
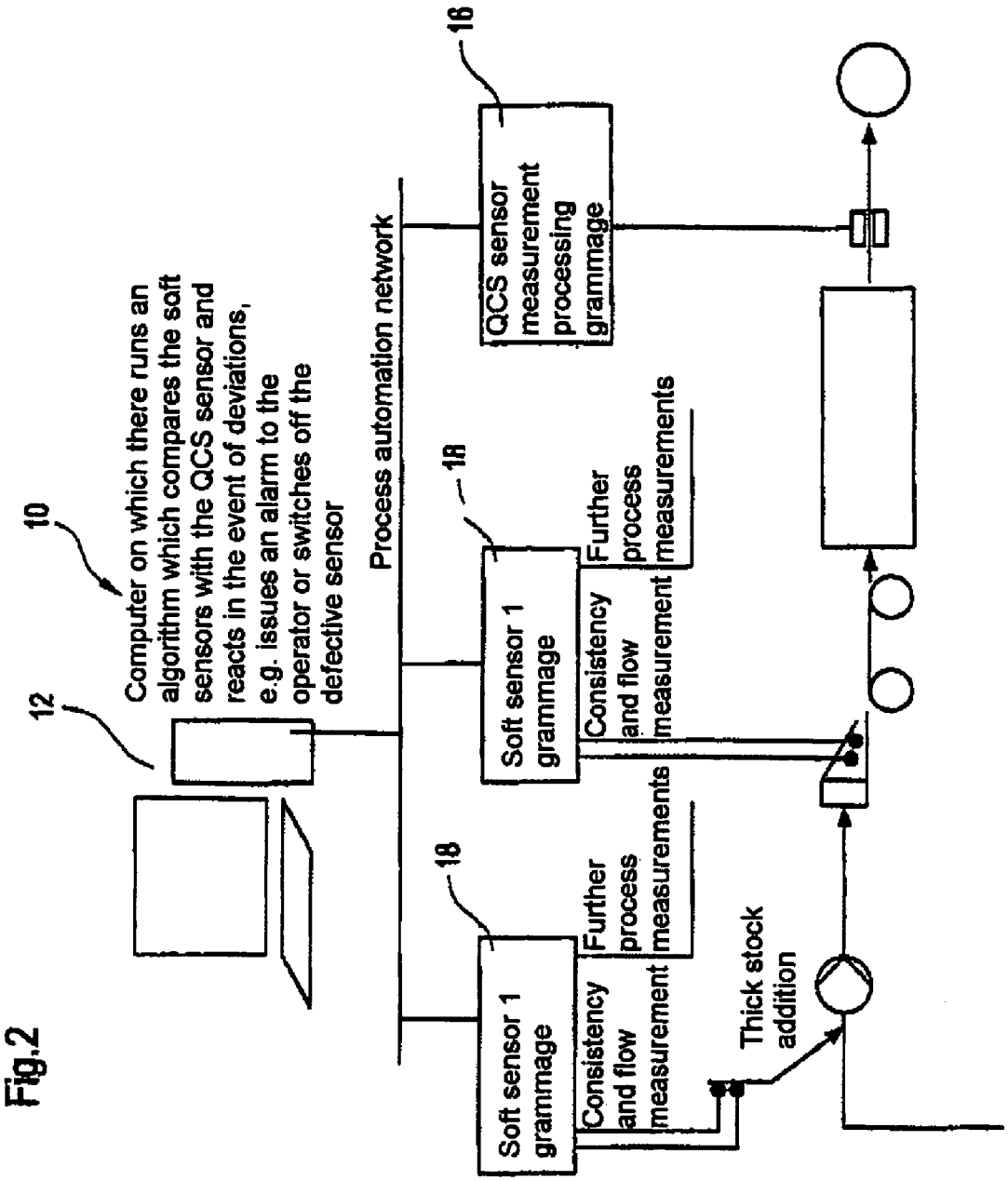
FIG. 2 shows a schematic illustration of an exemplary application of the system of FIG. 1 for monitoring QCS sensors by way of two soft-sensors.

Now, additionally referring to FIG. 2, there is shown a schematic illustration of an application of system 10 for checking at least one QCS sensor 16 (QCS=quality control system) by way of two soft-sensors 18. System 10 again includes a computer or an operation and linking unit 12. On computer 12 there runs an algorithm which compares soft-sensors 18 with QCS sensor 16 and reacts in the event of deviations, for example by an alarm being issued to the operator and/or the defective sensor being switched off. Computer 12 is embedded in an automation system.

Figure 3:
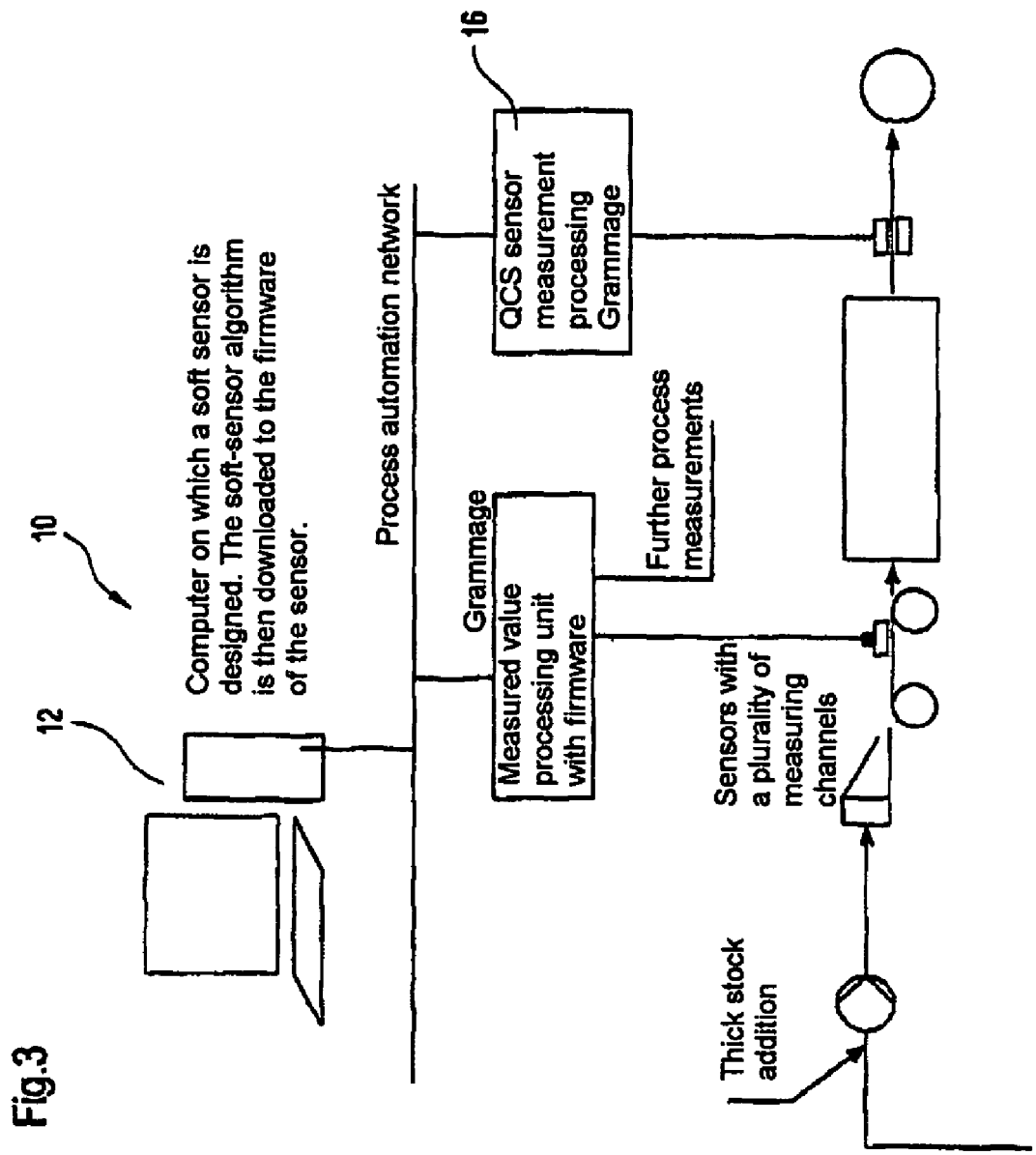
FIG. 3 shows a schematic illustration of an exemplary application of the system of FIG. 1 for the grade-independent calibration of sensors.
Figure 4:
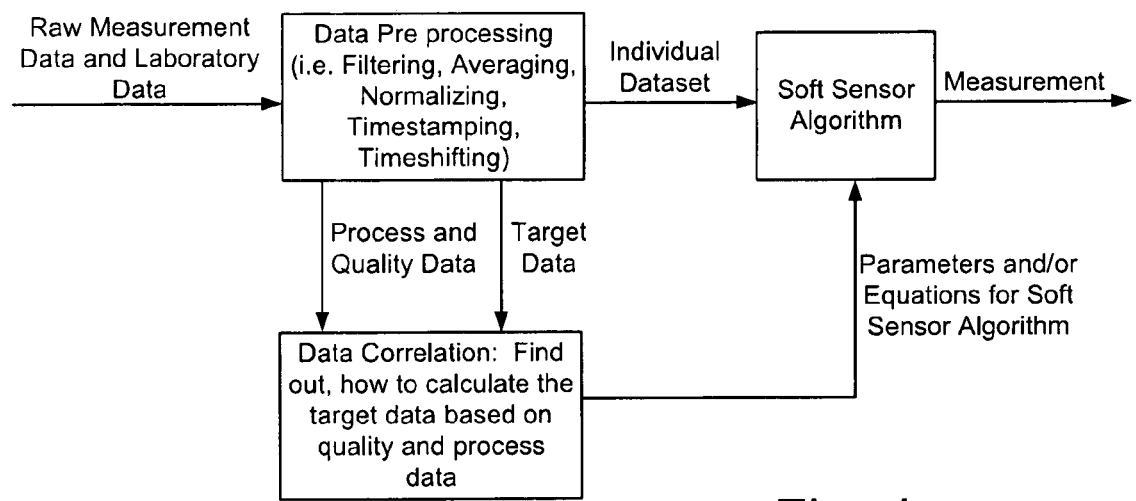
FIG. 4 is a schematic illustration of the flow of data and the operations thereon of the present invention.
Figure 5:
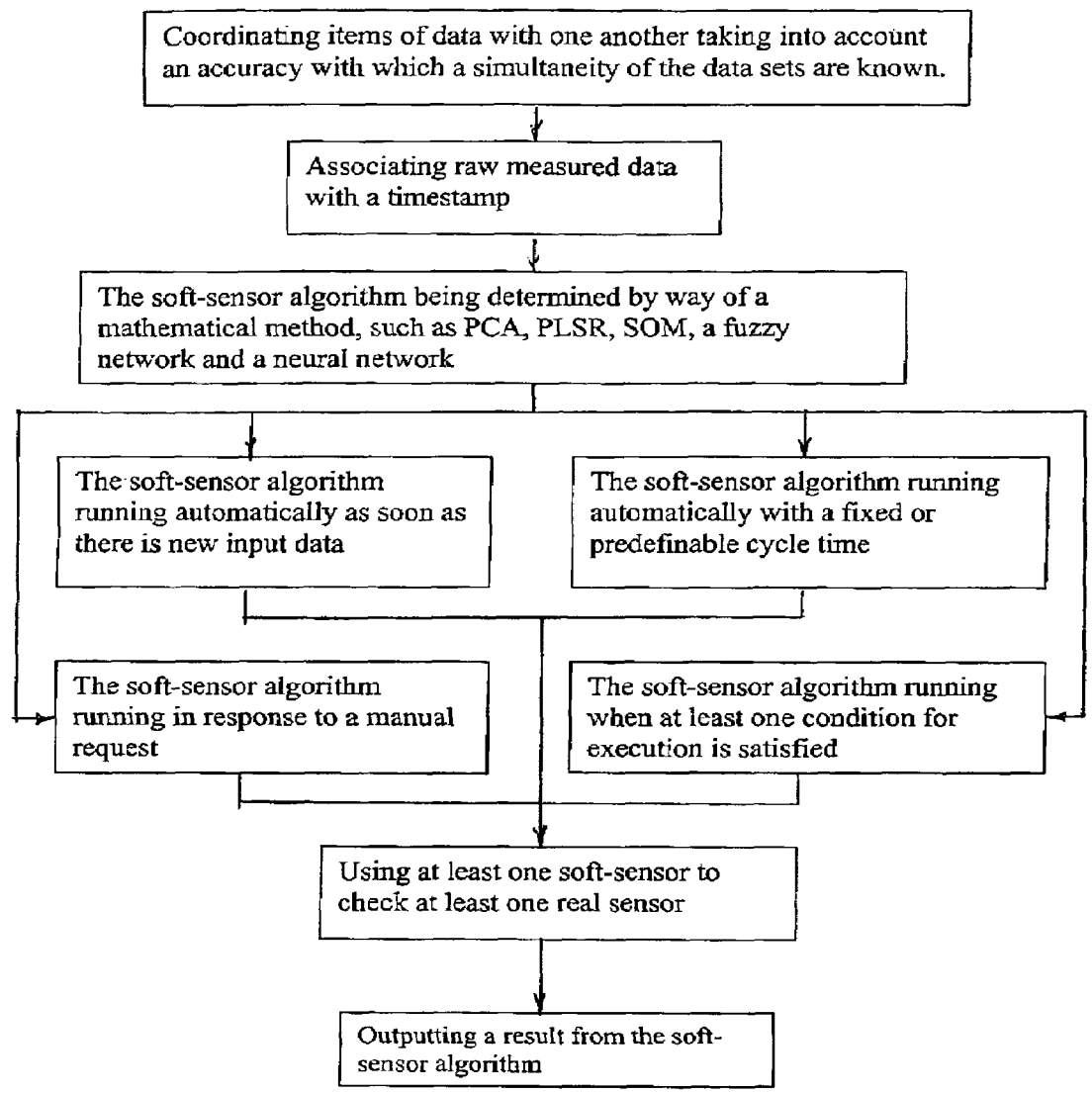
FIG. 5 is a further schematic illustration of the flow of data and the operations thereon of the present invention.

Now, additionally referring to FIG. 3, there is shown a schematic illustration of an application of system 10 according to the present invention to the grade-independent calibration of sensors. System 10 again includes a computer or an operation and linking unit 12. A soft-sensor is designed on computer 12. The soft-sensor algorithm is then downloaded to the firmware of the sensor. Computer 12 is again embedded in an automation system.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

LIST OF DESIGNATIONS

10 System
12 Computer, operation and linking unit
14 Computer
16 QCS sensor
18 Soft-sensor

What is claimed is:

1. A method for the computer-aided measurement of at least one of quality and process data during one of production and conversion of a fiber material web, comprising the steps of:
    correlating raw measured data with target data, said raw measured data being present in the form of other quality and process data gathered during one of the production and the conversion of the material web, said correlation including at least one of:
        incorporating measurements of quality parameters in a laboratory with said raw measured data; and
        combining portions of said raw measured data to form data sets, which are determined simultaneously;
    running at least one soft-sensor algorithm in a computer-based operation and linking unit;
    selecting specific laboratory or quality measurements to serve as target data, which by way of said soft-sensor algorithm is calculated from said other quality and process data serving as input data, each said data set containing measured data, which relates approximately to a monitored volume of the material web and raw material;
    pre-filtering items and data; and
    coordinating said items of data with one another taking into account an accuracy with which a simultaneity of said data sets are known.

2. The method of claim 1, wherein said raw measured data is associated with a timestamp.

3. The method of claim 1, wherein said soft-sensor algorithm is determined by way of a mathematical method including at least one of a Principal Component Analysis (PCA), a Partial Least Squares Recursive (PLSR), a Self Organizing Map (SOM), a fuzzy and neural network.

4. The method of claim 1, wherein said soft-sensor algorithm runs automatically as soon as there is new input data.

5. The method of claim 1, wherein said soft-sensor algorithm runs automatically with one of a fixed and predefinable cycle time.

6. The method of claim 1, wherein said soft-sensor algorithm runs in response to a manual request.

7. The method of claim 1, wherein said soft-sensor algorithm runs when at least one condition for execution is satisfied.

8. The method of claim 1, further comprising the step of outputting a result from said soft-sensor algorithm by way of at least one of a display and a printer unit.

9. The method of claim 2, wherein said timestamps are provided with an offset to compensate for transport dead times which said monitored volume runs through during one of the production and the conversion process.

10. The method of claim 1, further comprising the step of determining said items of data from a sliding average filter and a predefinable window size.

11. The method of claim 1, wherein said input data additionally includes data from other sections of one of the production and the conversion process as said target data.

12. The method of claim 1, further comprising a step of determining at least one soft-sensor by way of a design tool.

13. The method of claim 12, wherein said design tool extracts recorded input data and target data from a database having historic data.

14. The method of claim 13, further comprising a step of selecting from said historic data at least one of two groups of data sets including a first group and a second group, said first group containing a training data set used to calculate said soft-sensor algorithm, said second group containing a test data set having other data used to test a calculation of said soft-sensor algorithm.

15. The method of claim 14, wherein said first group containing training data is further subdivided into a plurality of groups of data sets used during a training process.

16. The method of claim 14, further comprising a step of testing said input data by way of said design tool to determine if some of said input data is not correlated with said target data and eliminating such data from said training data set.

17. The method of claim 14, further comprising a step of testing said input data by way of said design tool to determine which of said input data in said training data set is redundant, with continuing use made of only said input data which improves the correlation with said target data.

18. The method of claim 14, further comprising a step of testing said input data by way of said design tool to determine which of said input data in said training data set has a non-linear relationship with said target data and adding such data to said training data set.

19. The method of claim 14, further comprising a step of determining a calculation formula of said soft-sensor algorithm by way of said design tool with said training data set.

20. The method of claim 14, further comprising a step of testing said soft-sensor algorithm by way of said design tool using a test data set.

21. The method of claim 14, wherein by way of said design tool a calculation formula of said soft-sensor algorithm is implemented in an associated computer, said algorithm configured such that in the event of a respective change in said input data then said target data is output such that said output behaves like a sensor.

22. The method of claim 12, wherein said soft-sensor algorithm is automatically adapted to slow changes in one of the production and conversion process by way of repeated automatic starting of said design tool allowing data from a specific time window of the past to continue to be used.

23. The method of claim 1, further comprising using at least one soft-sensor based on said at least one soft-sensor algorithm during one of production and conversion of the material web.

24. The method of claim 23, wherein at least one said soft-sensor is used to check at least one real sensor.

25. The method of claim 24, wherein at least one soft-sensor determines at least one of a grammage and a thickness of the material web in order to check a scanner.

26. The method of claim 25, wherein said at least one soft-sensor is two soft-sensors used in a two-of-three rule to decide if there is a possible fault in one of said two soft-sensors and said scanner.

27. The method of claim 26, wherein said two soft-sensors include a first soft-sensor and a second soft-sensor, said first soft-sensor utilizes at least one of flow and consistency data from a region of a flow box, said second soft-sensor utilizing at least one of flow and consistency data from a thick stock feed.

28. The method of claim 23, further comprising the steps of:
predicting a grammage of the material web apart from a flow and consistency measurement; and
measuring one of ash and ash metering quantity.

29. The method of claim 23, further comprising the step of predicting a thickness of the material web using at least one process variable including stock composition, press settings and calender settings.

30. The method of claim 24, further comprising the step of activating an alarm system if a fault is found in checking at least one said real sensor.

31. The method of claim 24, further comprising the step of substituting at least one said soft-sensor for at least one said real sensor in the event of a fault.

32. The method of claim 31, wherein said substituting step is carried out automatically when said at least one said real sensor is identified as faulty by using a two-of-three rule.

33. The method of claim 24, further comprising the step of checking a first of said at least one soft-sensors and substituting a second of said at least one said soft-sensors and one of said real sensors in the event of a fault of said first of said at least one soft-sensors.

34. The method of claim 24, further comprising the step of grade-independent calibrating of at least one said real sensor using at least one said soft-sensor.

35. The method of claim 34, wherein said at least one real sensor has at least one internal measuring channel that is extended by incorporating further process and quality data in order to calculate an actual measured variable.

36. The method of claim 35, wherein said at least one real sensor includes a real moisture sensor having grammage and type of fiber data incorporated.

37. The method of claim 23, further comprising the step of providing a dewatering process wherein at least one said soft-sensor is used to measure a dryness of the material web, said at least one soft-sensor having raw measurement channels additionally incorporates further process parameters, said ray measurement channels including at least one of optical, electromagnetic and radioactive absorption, said further process parameters including at least one of stock consistency in a flow box, type of stock and settings dewatering parameters.

38. The method of claim 23, wherein said at least one soft-sensor is used instead of a respective real sensor as long as said real sensor is not ready for use.

39. The method of claim 23, wherein said at least one soft-sensor is configured to be used to measure the quality data which can usually only be measured by one of a laboratory and online using real sensors.

40. The method of claim 23, wherein said soft-sensor is used to measure a porosity, printability and strength parameters of the material web.

41. The method of claim 39, wherein the quality data that is expected for current measured variables is calculated, as a calculated value, and monitored aided by a calculation formula of said soft-sensor algorithm.

42. The method of claim 41, wherein if said calculated value lies outside of tolerance limits then one of a warning signal is generated and predefined measures are automatically taken.

43. The method of claim 42, wherein said predefined measures includes a change in process parameters to directly eliminate a cause of deviation.

44. The method of claim 43, wherein said predefined measures include a change in parameters from process steps that follow a subprocess responsible for said deviation.

45. The method of claim 39, further comprising the step of measuring quality data for each spool of the material web, said quality data including strengths, porosity and surface properties.

46. The method of claim 39, further comprising the step of measuring quality data which was not previously measured for each spool of the material web, said quality data including printability values being at least one of mottling and missing dots on a portion of the material web using one of a laboratory and industrial printing process.

47. The method of claim 23, further comprising the step of automatically regulating quality parameters using said at least one soft-sensor, said quality parameters including porosity, printability and strength parameters.

48. The method of claim 23, wherein said at least one soft-sensor is used for determining process characteristic curves.

49. The method of claim 23, further comprising the step of predicting an anticipated effect on changes of one of the production and conversion process before said changes are made to process variables, wherein said at least one soft-sensor is used in the context of an if-then analysis to effect said predicting step.

50. The method of claim 49, wherein said predicting step is used for at least one process and quality control system.

51. The method of claim 23, further comprising the step of determining one of optimal machine settings and optimal process parameters using said at least one soft-sensor together with at least one mathematical optimization method.

52. The method of claim 51, wherein at least one said soft-sensor is determined by way of a design tool, said input data and said target data recorded by way of said design tool are extracted from a database having historic data, at least two groups of data sets being selected from said historic data including a first group and a second group, said first group including a training data set used to calculate said soft-sensor algorithm, said second group including a test data set having other data used to test the calculated soft-sensor algorithm.

53. The method of claim 51, wherein one of said machine settings and said process parameters have specific quality properties which are optimized by way of at least one mathematical optimization method.

54. The method of claim 51, further comprising the step of carrying out at least one confirmation trial for a verification purpose.

55. The method of claim 51, wherein one of the production and the conversion process is changed to one of said optimal machine settings and said optimal process parameters.

* * * * *